May 8, 1923.

B. B. LORENZ 1,454,122

VEHICLE WHEEL

Filed Jan. 4, 1922

Inventor
Byron B. Lorenz.
By Lancaster and Allwine
Attorneys

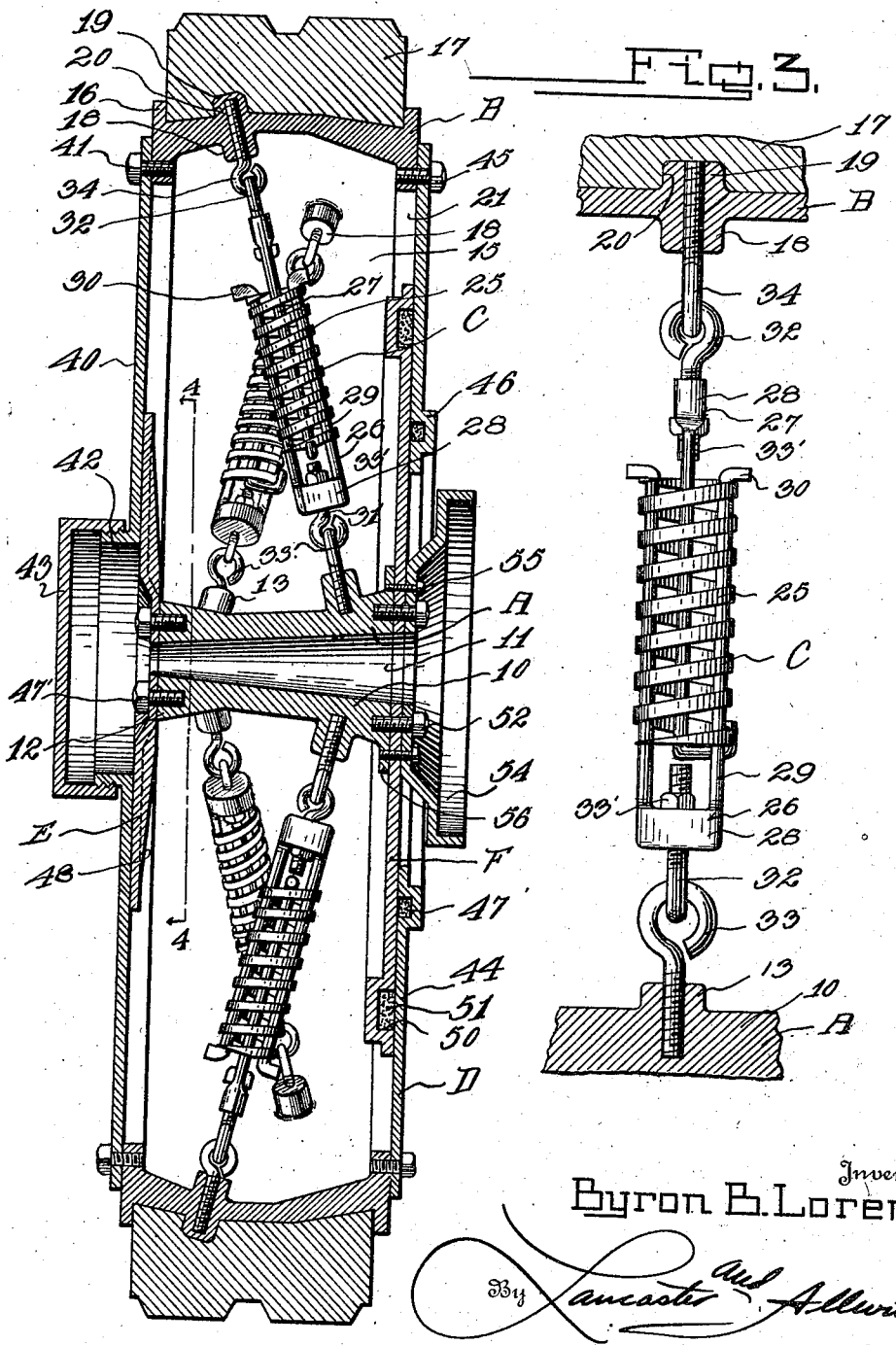

May 8, 1923.

B. B. LORENZ

VEHICLE WHEEL

Filed Jan. 4, 1922

Inventor
Byron B. Lorenz
By Lancaster and Allwine
Attorneys

Patented May 8, 1923.

1,454,122

UNITED STATES PATENT OFFICE.

BYRON B. LORENZ, OF CAPE GIRARDEAU, MISSOURI.

VEHICLE WHEEL.

Application filed January 4, 1922. Serial No. 527,002.

*To all whom it may concern:*

Be it known that I, BYRON B. LORENZ, a citizen of the United States, residing at Cape Girardeau, in the county of Cape Girardeau and State of Missouri, have invented certain new and useful Improvements in Vehicle Wheels, of which the following is a specification.

This invention relates to vehicle wheels of the resilient type, and the primary object of the present invention is to provide a novel wheel embodying coil springs for absorbing shock and for supporting the vehicle body, thereby eliminating the necessity of providing pneumatic tires, the disadvantages of which are only too well known to the automobile trade.

Further objects of the invention are first, the provision of a novel arrangement of springs in the wheel for permitting the weight of the vehicle to be supported in an advantageous manner; second, a novel means for connecting the springs in position so that the springs may be readily set in place and the tension thereof adjusted; third, a novel hub and a novel felly construction; and forth, novel thrust plates carried by the hub construction for engaging the housing plates carried by the felly construction.

A further object of the invention is the provision of means for connecting the parts of the wheel together, so that lubricating oil can be placed within the wheel for effectively lubricating the various parts thereof without the likelihood of the oil seeping out of the wheel.

A still further object of the invention is the provision of an improved spring wheel of the above character which will be durable and efficient in use, one that will be simple and easy to manufacture, and one which can be placed upon the market at a reasonable cost.

With these and other object in view, the invention consists in the novel construction, arrangement and formation of parts, as will be hereinafter more specifically described, claimed and illustrated in the accompanying drawings, forming a part of this specification, in which drawings:

Figure 2 is a diametric section through the wheel, taken on the line 2—2 of Figure 1.

Figure 3 is an enlarged fragmentary sectional view through a portion of the wheel illustrating the means of connecting the shock absorbing and weight supporting springs in position.

Figure 1:
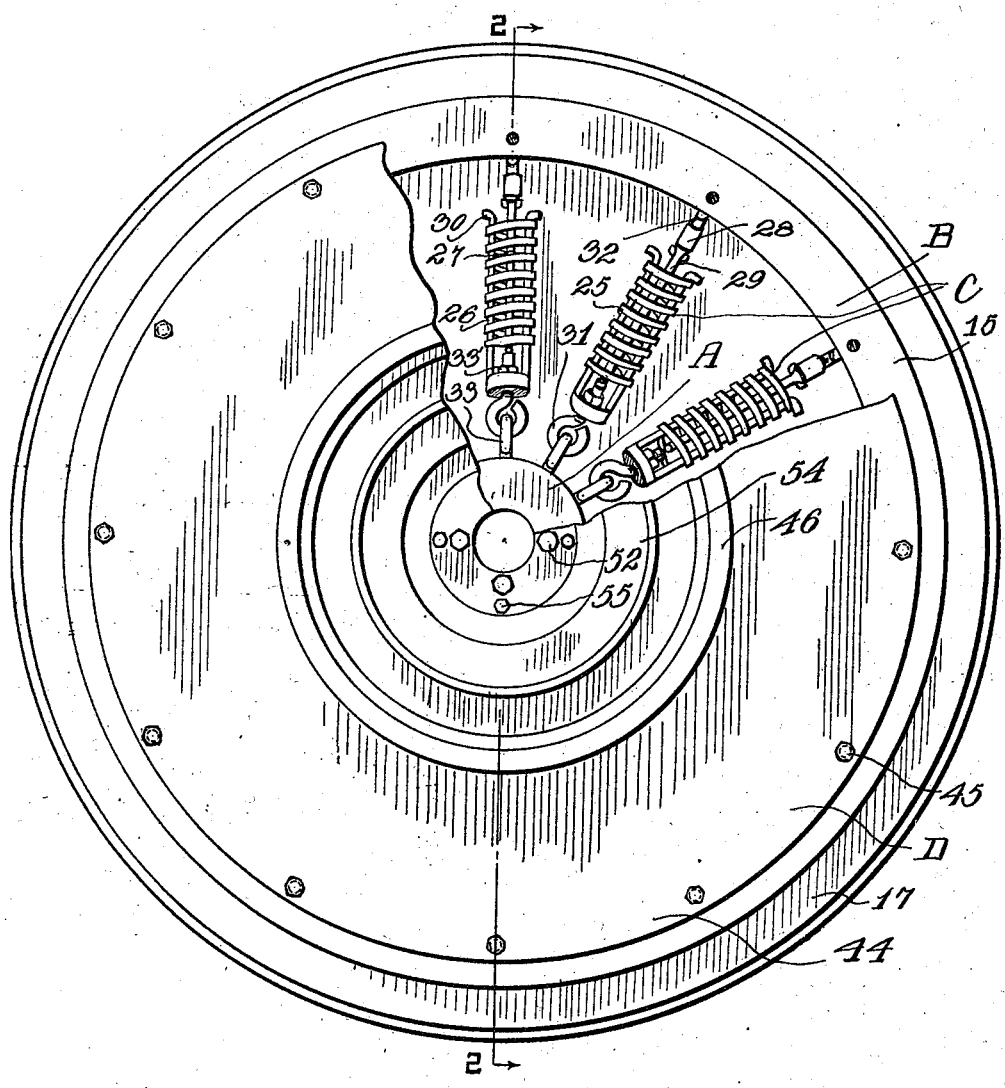
Figure 1 is an elevation of the improved wheel, parts thereof being broken away to illustrate the shock absorbing and weight supporting springs therein.
Figure 4:
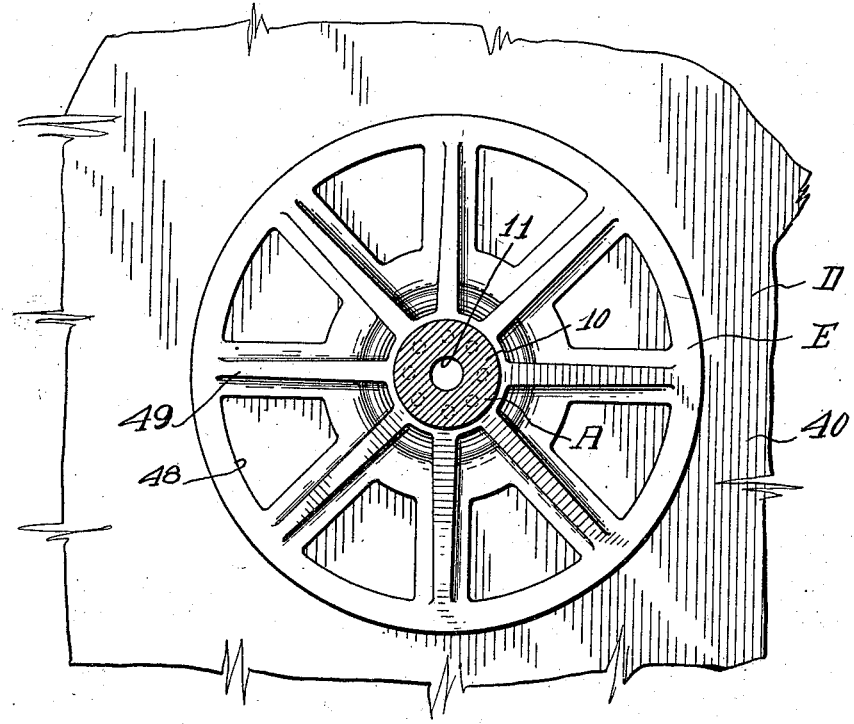
Figure 4 is an enlarged fragmentary section through the wheel taken on the line 4—4 of Figure 2, illustrating one of the novel thrust plates carried by the hub construction.
Figure 5:
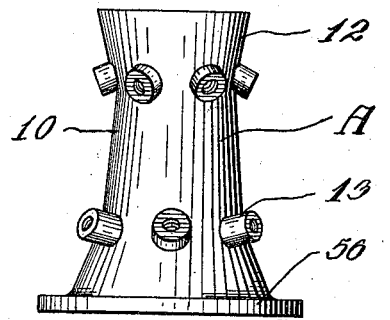
Figure 5 is an elevation of the novel hub construction.

Referring to the drawings in detail, wherein similar reference characters designate corresponding parts throughout the several views, the letter A indicates the hub of the wheel; B, the felly of the wheel; C, the novel means for connecting the hub construction A with the felly construction B; D, the housing plates carried by the felly construction; and E and F the novel thrust plates carried by the hub construction for engaging the housing plates D.

The hub construction A includes a conical shaped body 10 having a tapered bore 11 extending concentrically therethrough for the reception of the usual axle end. The axle end may be secured to the hub if the axle is of the drive or live type or the hub may be rotatably mounted upon the axle end if the same is of the stationary or dead type. The outer end of the conical shaped body 10 is gradually flared outwardly or increased in diameter toward its outer end to provide a wide bearing face 12, the purpose of which will be hereinafter more fully described. On each side of the transverse center of the body or member 10 is provided an annular row of internally threaded nipples 13, which are inclined inwardly toward each other, for a purpose which will be also hereinafter more fully described.

The felly B is preferably formed of metal, such as steel or the like, and includes an annular band 15 which is adapted to surround the hub construction A and the periphery of the band 15 at its circumferential edges is provided with outwardly extending tire retaining flanges 16, between which the tire 17 is adapted to seat. The tire 17 may be of any preferred character, and as shown is formed of solid rubber. In some instances, such as in the use of farm machinery and tractors, metallic tires will be more advantageous than rubber tires. The inner face of the felly 15 has formed thereon on each side of the circumferential center thereof, an annular row of internally threaded nipples 18. These nipples 18 extend at an angle inwardly toward each other and it can be seen by referring to Figure 2 of the drawings that the nipples 18 carried by the felly B and disposed on one side of the circumferential center thereof are in direct alignment with the nipples 13 formed on the opposite side of the central portion of the hub construction A. The nipples 18 are preferably extended beyond the outer face or periphery of the felly B as at 19, so that a relatively long nipple will be formed and so that projections will be made on the periphery of the felly in order to prevent circumferential creeping of the tire 17 thereon. Seats 20 may be made in the inner surface of the tire for the reception of the projecting portions 19 of the nipples 18.

The inner face of the felly B is provided with inwardly extending annular attaching flanges 21 at its circumferential edges which are adapted to be attached to the housing plates D which will be hereinafter more fully described.

The improved means C for resiliently connecting the hub A with the felly B consists essentially of a plurality of connection coil springs 25 of a relatively heavy type. These springs are confined between oppositely extending retaining hooks 26 and 27. These retaining hooks 26 and 27 are constructed substantially the same and each includes a socket or head 28 and arms 29, which terminate in outwardly extending ears 30, which are adapted to engage the opposite terminals of the spring 25. The sockets or heads 28 of the spring retainers 26 and 27 have the threaded shanks of the eye bolts 31 and 32 disposed therein and suitable nuts 33' are threaded on these shanks for holding the eye bolts in position. It can be seen that the eye bolts can be adjusted longitudinally of the spring retainers by said nuts. The eye bolts 31 and 32 are in turn connected with suitable eye bolts 33 and 34, the shanks of which are threaded and fitted respectively in the nipples 13 and 18. Each alternate spring is inclined in the same direction and adjacent springs are inclined in opposite directions, as clearly shown in Figure 2 of the drawings. These springs cross each other, which permits a greater number of the springs to be incorporated in the wheel and which tends to eliminate the side thrust in the wheel. Thus it can be seen that if an eye bolt 34 is connected in a nipple 18 disposed on one side of the circumferential center of the felly, its companion eye bolt 33 is connected to a nipple 13 carried by the hub disposed on the other central side of the hub.

Housing plates D for the wheel consists of an outer circular plate 40, the periphery of which may be connected by cap screws 41 to the outer attaching or retaining flange 21. The axial center of the plate 40 is provided with an outwardly extending annular flange 42 to which may be connected a suitable hub cap 43. An annular plate 44 is carried by the opposite edge of the felly B and is secured to the inner attaching or retaining flange 21 by suitable cap screws 45. The inner edge of this annular plate 44 may have formed therein an annular pocket 46 for the reception of the packing gasket 47, the purpose of which will also be hereinafter more fully described.

The thrust plates E and F are adapted to engage respectively the housing plate 40 and the annular plate 44 and the plate E is secured by suitable cap screws 47' to the outer end of the hub A and is preferably cut out at different points, as at 48 so as to lighten the weight thereof and if desired radially extending reinforcing ribs 49 can be provided so as to add rigidity to this thrust plate. This plate or disc E engages a relatively large area of the housing plate 40 and the thrust of the hub A will be transmitted to said housing plate 40.

The inner edge of the hub A supports the thrust plate F which has a relatively greater diameter than the thrust plate E and the outer edge thereof may have formed therein a suitable pocket 50 for the reception of packing 51. This thrust plate F engages the inner face of the housing plate 44 and any end thrust of the hub A will be transmitted to the said housing plate 44 and then to the felly. This plate F is adapted to be connected to the hub A by suitable cap screws 52 and if the wheel is of a drive type, a brake drum 54 can be connected to the hub A by the same cap bolts 52. Small cap bolts 55 can also be utilized for connecting the brake drum in position. The inner edge of the hub is preferably provided with an outwardly extending annular attaching flange 56 for the reception of the cap bolts 55 as can be clearly seen by reference to Figure 2 of the drawings.

In order to prevent free movement of the thrust plates E and F in relation to the housing plates 40 and 44 and to permit the thorough lubrication of the spring connecting means C, the wheel is adapted to be filled or partially filled with some good grade of lubricating oil and the provision of the gaskets 46 and 51 will prevent the leakage of oil from out of the wheel. The oil can be introduced in the wheel through the openings 48, provided for permitting the lightening of the wheel. In applying the springs to the wheel, the same are first compressed in a vice or the like and held in a compressed position by a wire or the like. The hooks or spring retainers 26 and 27 are then slipped through the springs and the eye bolts 33 and 34 placed in position and the nipples 13 and 18, the eyes 31 and 32 having been previously connected with the eye bolts 33 and 34. The wires are then removed from the springs 25, which permit the same to resume their normal position.

The arrangement of the springs permits a relatively large number thereof to help support the load, and these springs will tend to absorb shock and effectively tend to prevent the transmission of shock to the vehicle body.

From the foregoing description, it can be seen that an improved resilient wheel has been provided which will resiliently support the load and prevent transmission of shock to the vehicle, thereby eliminating the necessity of providing pneumatic tires for the wheel.

Changes in details may be made without departing from the spirit or scope of this invention; but,

I claim:

1. In a resilient wheel, a hub, a felly surrounding the hub having attaching flanges formed integral with the side edges thereof and extending inwardly toward said hub, and outwardly extending retaining flanges formed integrally on the opposite faces of the felly, a tire disposed on the outer face of the felly between said retaining flanges, inwardly extending attaching plates secured to the attaching flanges, thrust discs secured to the opposite faces of the hub for engaging the inner face of the housing plates, one of said thrust discs being formed relatively larger than the other, and resilient means for connecting the felly with the hub and disposed between said thrust discs and said housing plates.

2. In a resilient wheel, a hub having a row of retaining sockets formed on each side of the circumferential center thereof, a felly surrounding the hub having a row of inclined retaining sockets formed on the opposite sides of the circumferential center thereof, oppositely inclined coil springs, eye bolts adjustably fitted within all of the sockets, spring retaining members extending through said springs and engaging the opposite terminals thereof, and adjustable members carried by the free terminals of the spring retaining members and engaging said adjustable eye bolts.

BYRON B. LORENZ.